(12) United States Patent
Baumgartner et al.

(10) Patent No.: US 7,598,641 B2
(45) Date of Patent: Oct. 6, 2009

(54) ELECTRICAL MACHINE WITH PRELOADED BALL RACE AND METHOD FOR MANUFACTURING THE SAME

(75) Inventors: Joachim Baumgartner, Volkach (DE); Tobias Buban, Gerbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 392 days.

(21) Appl. No.: 11/381,466

(22) Filed: May 3, 2006

(65) Prior Publication Data
US 2006/0261693 A1    Nov. 23, 2006

(30) Foreign Application Priority Data
May 11, 2005    (EP)    ................... 05010258

(51) Int. Cl.
*H02K 5/16*    (2006.01)
(52) U.S. Cl. ........................... 310/90; 310/89; 310/254

(58) Field of Classification Search ............. 310/89–90, 310/254, 261
See application file for complete search history.

(56) References Cited

FOREIGN PATENT DOCUMENTS

| DE | 859 547 | 4/1952 |
|---|---|---|
| DE | 3534381 C2 | 11/1989 |
| DE | 4206761 C2 | 1/1995 |
| DE | 696 27 557 | 7/1996 |
| EP | 0 355 656 A2 | 8/1989 |
| EP | 0 723 088 A1 | 1/1996 |
| WO | 01/35515 A1 | 5/2001 |

*Primary Examiner*—Thanh Lam
(74) *Attorney, Agent, or Firm*—King & Spalding L.L.P.

(57) ABSTRACT

An electrical machine with a ball race preloaded by elastic deformation of a bearing end plate as well as a method for manufacturing the same comprises a stator and a rotor with rotor shaft. The rotor shaft is supported via the ball race in the bearing end plates. At least one bearing end plate is embodied so that it can be elastically deformed in an axial direction and the preloading of the ball race is created by a preloading of the bearing end plate in the axial direction.

14 Claims, 2 Drawing Sheets

ELECTRICAL MACHINE WITH PRELOADED BALL RACE AND METHOD FOR MANUFACTURING THE SAME

PRIORITY

This application claims priority from European Patent Application No. EP05010258, which was filed on May 11, 2005, and is incorporated herein by reference in its entirety.

TECHNICAL FIELD

The invention relates to an electrical machine with preloaded ball race and to a method for manufacturing the same.

BACKGROUND

Electrical machines which feature a stator and a rotor are already known. The rotor features a rotor shaft which is supported in rotor bearings. These types of electrical machine are employed in areas such as drives for auxiliary equipment in motor vehicles and can be used there as window lifting motors or as pump drives for example. The practical problem which arises with such machines is that radial and axial play occurs between the stator and the rotor. This leads to undesired noise during operation and furthermore also to a reduced lifetime of the rotor bearing.

An arrangement for setting of the axial play between the rotor and the stator of an electric motor is already known from DE 35 34 381 C2. With this known arrangement a bearing which is fixed under normal operating conditions is embodied for the rotor shaft as a cylinder bearing. To set the axial play the cylinder bearing can be shifted axially relative to its stator-side bearing end plate holder by a pressure greater than the axial load arising during normal operation.

A bearing arrangement for rotors of electrical machines is known from DE 42 06 761 C2 which contains two ball races to accept the ends of the rotor shaft. The inner rings of the two ball races are each mounted onto the bearing surfaces of the rotor shaft by means of an interference fit so as to prevent movement along the shaft. The associated outer rings of the ball races are supported in bearing end plates of the motor housing in a sliding fit. Furthermore the known arrangement features an axial adjusting spring supported on a bearing end plate which acts on the outer ring of one of the ball races. The two bearing end plates consist of metal parts or aluminum parts and feature cylindrically embodied, deep-drawn bearings. They are held together by means of spacer profiles under tensile stress. The adjusting spring is implemented as a wave spring which rests against the base of a deep-drawn bearing end plate and transfers its pressure force via the outer ring of the first ball race onto its inner ring, from there via the rotor shaft to the inner ring of the second ball race and then to its outer ring. This creates a ball race arrangement in which a long lifetime is obtained at low cost and with little noise generated even with high axial bearing loads.

SUMMARY

Using DE 42 06 761 C2 as its starting point, the object of the invention is to specify an electrical machine in which the number of components is reduced.

This object is achieved by an electrical machine comprising a stator and a rotor, wherein the rotor comprises a rotor shaft which is connected via at least one ball race to at least one bearing end plate, the ball race is preloaded in the axial direction, the bearing end plate is embodied to be elastically deformable in the axial direction, and wherein the preloading of the ball race is achieved by a preloading of the bearing end plate elastically deformable in the axial direction.

At least one bearing end plate can be pulled against the stator in the axial direction by the preloading. At least one ball race can be arranged on the outside of the at least one bearing end plate facing away from the stator. The rotor shaft can be supported in its two end areas each in a respective ball race, the ball race can be connected to a respective bearing end plate, one of the bearing end plates can be embodied to enable it to be elastically deformed in the axial direction and may serve as a preloading element for the ball race, and the other bearing end plate can be embodied rigidly in the axial direction. The bearing end plate embodied rigidly in the axial direction can be a rigid component of a housing of the stator of the electrical machine. The rotor shaft can be supported in its two end areas each in a respective ball race, the ball race can be connected to a respective bearing end plate, and both bearing end plates can be embodied for elastic flexibility in the axial direction and to serve as preloading elements for the ball race concerned. The bearing end plate serving as a preloading element may comprise an outer ring, an inner ring and a plurality of bars connecting the outer ring with the inner ring. The bars may run in a radial direction. The bars can be embodied bent and do not run in a radial direction.

The object can also be achieved by a method for manufacturing an electrical machine with preloaded ball race with the following steps:

inserting a first bearing end plate with the attached ball race into a production tool, inserting the rotor shaft with attached rotor package into the ball race, inserting the stator package and of the insulating disks such that the stator package is positioned around the rotor package in the axial direction, putting on a second bearing end plate together with an attached further ball race or putting on the second bearing end plate and the further ball race in turn so that the radial outer area of the further bearing end plate rest against the stator package and exerting an increased pressure on the rotor shaft and/or the inner ring of the further ball race to push it further in an axial direction such that the further bearing end plate is elastically deformed in its radial internal area, in order to introduce the preloading of the ball race.

The advantages of the invention lie especially in fact that no special spring device or other setting or adjustment devices are necessary for preloading of the ball race. The desired preloading of the ball race is achieved by at least one axially elastically deformable bearing end plate, by means of which at least one of the ball races is preloaded for example by an offset of 0.3 mm to 0.7 mm. In this way the play present in the ball race as well as further tolerances between the stator and the rotor of the electrical machine are compensated for. This results an increase of the lifetime of the relevant ball race and avoids any undesired noise developing during the operation the motor.

If the elastic deformation of the bearing end plate is directed towards the stator, an opposite preloading force is produced which preloads the bearing in a direction away from the stator. At the same time the bearing end plate is pulled against the stator by the reaction force generated by this. This means that the bearing end plate is also seated without any play on the stator without additional attachment elements for the bearing end plate.

The preloading of the bearing end plate, as described above, is achieved in an especially simple manner if the corresponding bearing for the rotor shaft is fitted on the outside of the bearing end plate facing away from the stator. The bearing can for example be accommodated in a recess on the outside of the bearing end plate, centered and attached within it by an interference fit. The preloading can then be simply created in that, when the bearing is pushed onto the rotor shaft, together with the bearing end plate or after a bearing end plate has been fitted beforehand, the bearing is pushed onto the rotor shaft in the direction of the rotor package up to the point at which the required elastic deformation of the bearing end plate is achieved.

The bending properties and thereby the flexibility of a bearing end plate will be improved if the bearing end plate features and outer ring, an inner ring and a plurality of bars separating the outer ring from the inner ring.

If the bars run in a radial direction, this facilitates the manufacturing process of the relevant bearing end plate, since in this case the cutouts present between adjacent bars, which are preferably formed as ovals, can be made using simple punching-out processes.

A curved orientation of the bars which does not run in the radial direction has the advantage of further improving the flexibility or bending properties of the relevant bearing end plate.

BRIEF DESCRIPTION OF THE DRAWINGS

Further advantageous features of the invention are produced by explaining examples of them with reference to the figures. The drawings show FIG. 1 a cross-sectional diagram of an electrical machine in accordance with an exemplary embodiment for the invention, FIG. 2 an enlarged diagram of a part area of the electrical machine shown in FIG. 1, FIG. 3 a perspective drawing of a first exemplary embodiment for a bearing end plate flexible in the axial direction and FIG. 4 a perspective drawing of a second exemplary embodiment for a bearing end plate flexible in the axial direction.

DETAILED DESCRIPTION

Figure 1:
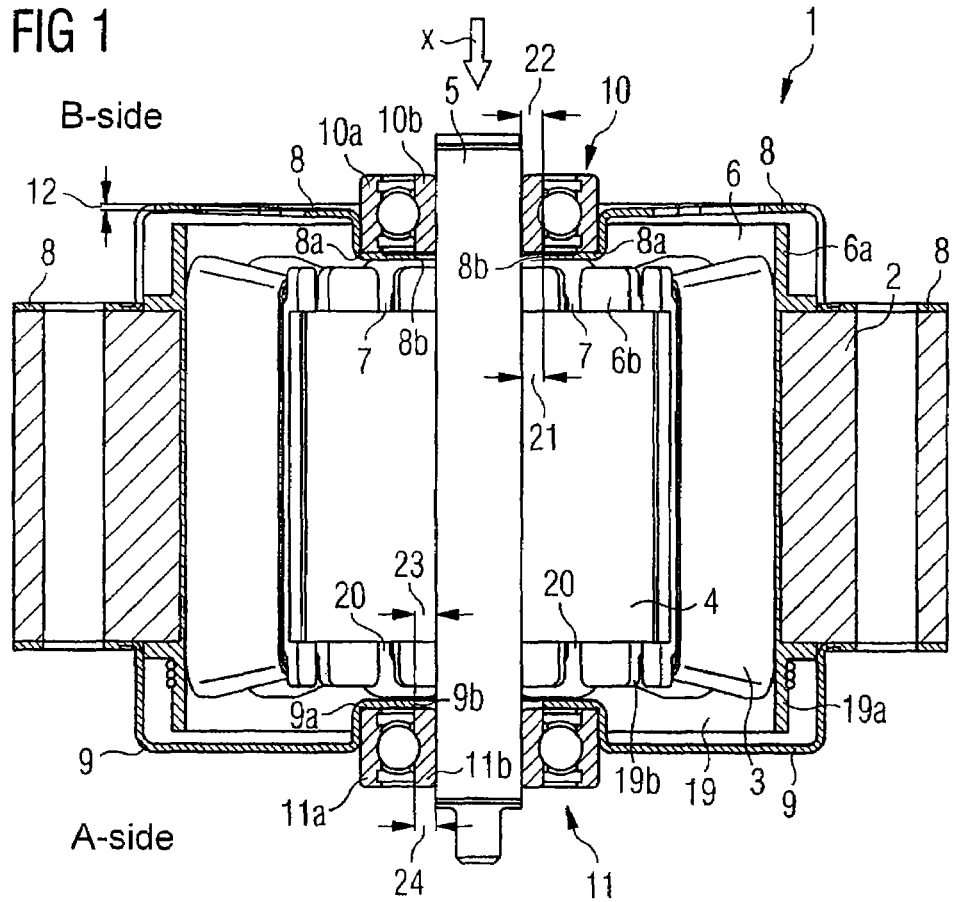
FIG. 1 shows a cross-sectional diagram of an electrical machine in accordance with a first exemplary embodiment for the invention.

The electric motor 1 shown features a stator module, essentially consisting of a stator package 3 with a stator core 2 and two insulating disks 6/19. Furthermore the electric motor shown features a rotor module essentially consisting of a rotor shaft 5 and a rotor package 4. The rotor shaft 5 is supported in the B-side end area of the electric motor in a first ball race 10 and in the A-side end area of the electric motor in a second ball race 11.

The first ball race 10 features an outer ring 10a and an inner ring 10b. The inner ring 10b is fixed to the rotor shaft 5. The second ball race 11 features an outer ring 11a and an inner ring 11b. The inner ring 11b is fixed to the rotor shaft 5.

An insulating disk 6 is positioned on the B-side end face of the electric motor. This features an outer wall 6a and an inner wall 6b each with a plurality of tooth-shaped elevations with intermediate spaces 7 lying between them. On the opposite A-side end face of the electric motor is arranged a corresponding insulating disk 19 with outer wall 19a and inner wall 19b, which also consists of a plurality of tooth-shaped elevations with intermediate spaces 20.

The B-side ball race 10 is attached facing away from the stator package on the outer side of the bearing end plate 8 which covers the B-side end face of the electric motor, with the exception of the end area of the rotor shaft. The bearing end plate 8, for the purposes of positioning the ball race 10, features a circular indentation which appears in the drawing as step 8a in which the ball race 10 is accommodated on the outside and is fixed by an interference fit where necessary. The radial inner end 8b of the step 8a of the bearing end plate 8 is spaced from the rotor shaft 5 such that the bearing end plate 8 does not extend into the area of the inner ring 10b of the ball race 10. By consequence the spacing 21 of the inner end 8b of the step 8a of the bearing end plate 8 from the rotor shaft 5 is greater than the width 22 of the inner ring 10b of the ball race 10.

The A-side ball race 11 is attached facing away from the stator package on the outer side of the bearing end plate 9 which covers the A-side end face of the electric motor with the exception of the end area of the rotor shaft. The bearing end plate 9, for the purposes of positioning the ball race 11, features a circular indentation which appears in the drawing as step 9a in which the ball race 11 is accommodated on the outside and is fixed by an interference fit where necessary. The radial inner end 9b of the step 9a of the bearing end plate 9 is spaced from the rotor shaft 5 such that the bearing end plate 8 does not extend into the area of the inner ring 11b of the ball race 11. By consequence the spacing 23 of the inner end 9b of the step 9a of the bearing end plate 9 from the rotor shaft 5 is greater than the width 24 of the inner ring 11b of the ball race 11.

Furthermore, with the electric motor 1 shown in FIG. 1 the B-side ball race 10 is preloaded in the sense that any play introduced in manufacturing between the outer ring 10a and the inner ring 10b is compensated for. Furthermore this preloading also compensates for play attributable to other causes.

To enable the ball race 10 to be preloaded in this way, the bearing end plate 8 is embodied to allow elastic deformation in the axial direction. In other words this means that the bearing end plate 8 can be expanded or bent in the axial direction and is provided with comparatively small spring stiffness.

The ball race 10 is preloaded as follows: In a first step the A-side bearing end plate 9 with ball race 11 attached to it is inserted into a production tool.

Then in a second step the rotor shaft 5 with the rotor package 4 attached to it is inserted through the central opening of the A-side bearing end plate 9 into the ball race 11. The attachment of the inner ring 11b of the ball race on the rotor shaft 5 can be guaranteed in this case by an interference fit.

Then in a third step the stator with the insulating disks is put on such that the stator package 3 seen in the axial direction is positioned around the rotor package 4. Then in a fourth step the B-side bearing end plate 8 together with the ball race 10 attached to it or also first the bearing end plate 8 and then after it the ball race 10 are put on such that the radial outer area of the bearing end plate 8 is resting on the stator core 2. An interference fit can also be provided between the bearing end plate 8 and the stator core 2.

Finally, in a fifth step, by exerting an increased pressure on the rotor shaft 5 and/or the inner ring 10b of the ball race and pushing it onwards in the direction of the arrow x shown in the FIG. 1, the axially elastically deformable bearing end plate 8 is pressed downwards in the area of the step 8a (in the direction of the rotor package), so that an axial offset 12 arises, which for example lies in the range of 0.3 to 0.7 mm. This axial offset of the internal radial area of the bearing end plate 8 in comparison to the external radial area of the bearing end plate 8 simultaneously brings about the above-mentioned preloading of the ball race 10. The use of the tool is independent of the motor length in this case.

The axial adjustment spring realized as a wave spring in the prior art can thus be dispensed with since its function, namely a preloading of the ball race, is provided by the bearing end plate 8 which is present in any event.

In addition, the preloading of at least one bearing end plate 8/9 also exerts a reaction force from the bearing end plate 8/9 on the stator core 2. This means that the stator core 2 is loaded between the two bearing end plates (A-side/B-side). In other words both bearing end plates 8/9 are pulled against the relevant end faces of the stator core 2 and thereby additionally fixed on the stator core 2 or at least held in position.

In accordance with an embodiment of the invention the A-side bearing end plate 9 is rigidly embodied in the sense that it exhibits a strong spring stiffness. In this embodiment the axial play of the electric motor is compensated for exclusively by a preloading of the bearing end plate 8 and thereby of the ball race 10 introduced on the B-side.

In accordance with an alternative embodiment of the invention the A-side bearing end plate 8 is embodied flexibly, as is the B-side bearing end plate 9, so that with this alternative embodiment the axial play is compensated for by a preloading of both bearing end plates and thereby of both ball races.

Figure 2:
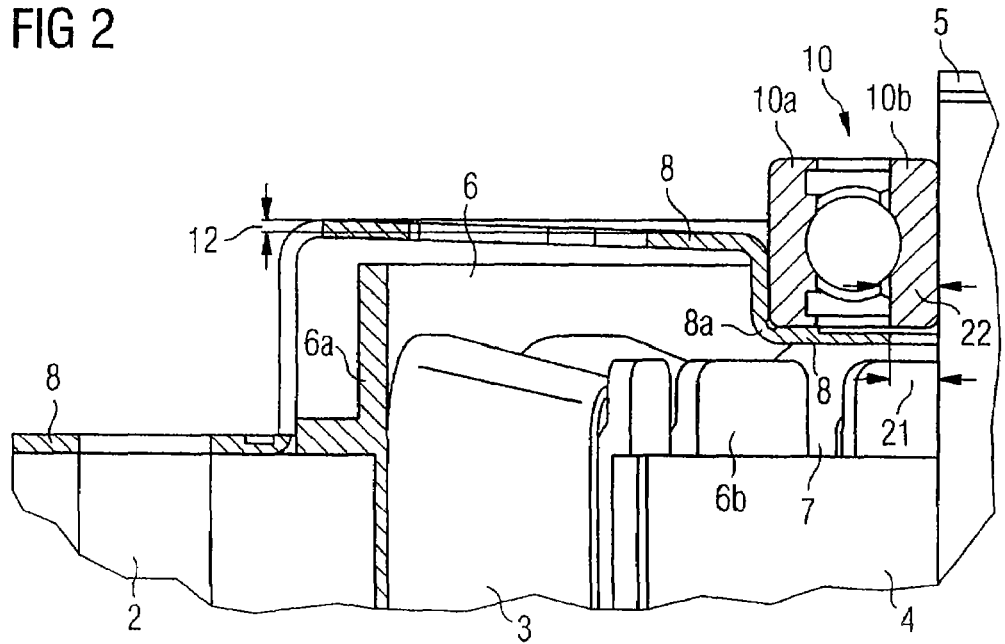

FIG. 2 shows an enlarged drawing of a part area of the electrical machine shown in FIG. 1. From this enlarged drawing it can be seen particularly well that the axially elastically deformable bearing end plate 8 has an offset 12 in the axial direction which was introduced by the elastic deformation of the internal radial area of the bearing end plate 8, and that through this deformation of the bearing end plate 8 the desired preloading of the ball race 10 has been introduced to compensate for axial play of the ball race 10 and thereby of the entire electric motor. This advantageously avoids undesirable noise during the operation of the motor. Furthermore an increased lifetime of the ball race is advantageously achieved in this way.

Figure 3:
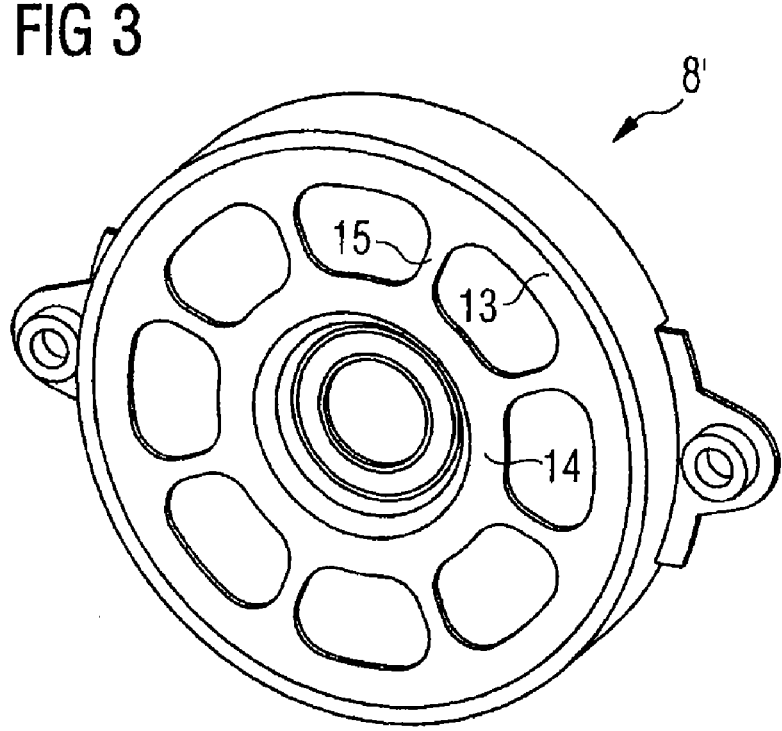

FIG. 3 shows a perspective drawing of a first exemplary embodiment of a bearing end plate flexible in the axial direction. The bearing end plate 8' shown features an outer ring 13 and an inner ring 14. The outer ring 13 is connected to the inner ring 14 via a plurality of radially-directed bars 15. The cutouts, essentially embodied as an oval shape, between adjacent bars have been created by a punching-out process using a conventional punching machine. By exerting pressure in the axial direction on the inner ring 14 with a fixed outer ring 13 the radial internal area of the bearing end plate 8' can be bent by comparison with the radial outer area, so that—as has been described above—this bending can introduce a preloading of the ball race attached in the radial internal area to the bearing end plate.

Figure 4:
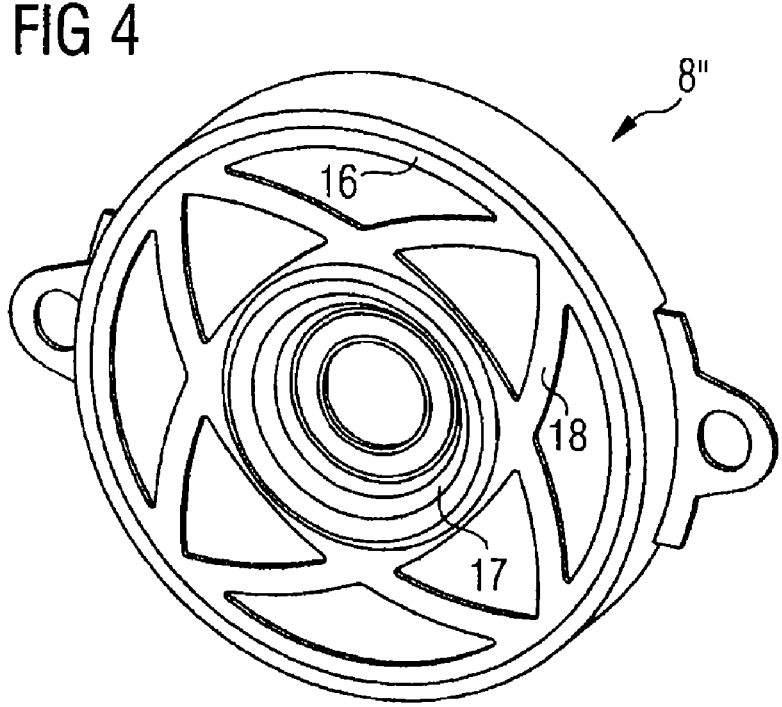

FIG. 4 shows a perspective drawing of a second exemplary embodiment of a bearing end plate flexible in the axial direction. The bearing end plate 8' shown features an outer ring 16 and an inner ring 17. The outer ring 16 is connected to the inner ring 17 via a plurality of bars 18, with these bars 18 being embodied bent and not running in a radial direction. In addition the bars 18 are also geometrically pre-bent axially in the bending direction (loading direction). They are then bent further on installation so that the desired preloading is obtained. With this type of embodiment of the bars the bending properties of the flexible bearing end plate are further improved. This has the advantage that a larger axial play can also be compensated for.

The invention has been described above with reference to a generally held exemplary embodiment, in which the stator features a stator core and a stator package and the rotor a rotor shaft and a rotor package. The invention is however applicable to all possible types of electric motor which feature a stator module and a rotor module. The stator module can contain a stator winding or an arrangement of shell magnets. The rotor module can contain rotor magnets of a rotor winding. The motor involved can be a synchronous motor, an asynchronous motor, a brush-equipped motor, a brushless motor etc.

What is claimed is:

1. An electrical machine comprising
a stator and
a rotor, wherein the rotor comprises a rotor shaft which is supported in its two end areas in a respective ball race, and each ball race is connected to a respective bearing end plate, wherein
one of the bearing end plates is configured to be elastically deformed in the axial direction and serve as a preloading element for the ball race, the ball race being preloaded in the axial direction by preloading of the one bearing end plate, and
the other bearing end plate is embodied rigidly in the axial direction.

2. An electrical machine in accordance with claim 1, wherein at least one bearing end plate is pulled against the stator in the axial direction by the preloading.

3. An electrical machine in accordance with claim 1, wherein at least one ball race is arranged on the outside of the at least one bearing end plate facing away from the stator.

4. An electrical machine in accordance with claim 1, wherein the bearing end plate embodied rigidly in the axial direction is a rigid component of a housing of the stator of the electrical machine.

5. An electrical machine in accordance with claim 1, wherein
the rotor shaft is supported in its two end areas in a respective ball race,
the ball race is connected to a respective bearing end plate, and
both bearing end plates are embodied for elastic flexibility in the axial direction and to serve as preloading elements for the ball race concerned.

6. An electrical machine in accordance with claim 1, wherein the bearing end plate serving as a preloading element features an outer ring, an inner ring and a plurality of bars connecting the outer ring with the inner ring.

7. An electrical machine in accordance with claim 6, wherein the bars run in a radial direction.

8. An electrical machine in accordance with claim 6, wherein the bars are embodied bent and do not run in a radial direction.

9. An electrical machine comprising:
a stator, and
a rotor comprising a rotor shaft which is connected via at least one first ball race to at least one first bearing end plate and via at least one second ball race to at least one second bearing end plate,
the at least one first ball race is preloaded in the axial direction,
the at least one first bearing end plate is embodied to be elastically deformable in the axial direction, and
wherein the preloading of the at least one first ball race is achieved by a preloading of the at least one first bearing end plate elastically deformable in the axial direction,
the at least one first bearing end plate is pulled against the stator in the axial direction by the preloading, and wherein the first ball race is arranged on the outside of the at least one first bearing end plate facing away from the stator, and the at least one second bearing end plate is embodied rigidly in the axial direction.

10. An electrical machine in accordance with claim 9, wherein the bearing end plate embodied rigidly in the axial direction is a rigid component of a housing of the stator of the electrical machine.

11. An electrical machine in accordance with claim 9, wherein the rotor shaft is supported in its two end areas in a respective ball race, the ball race is connected to a respective bearing end plate, and both bearing end plates are embodied for elastic flexibility in the axial direction and to serve as preloading elements for the ball race concerned.

12. An electrical machine in accordance with claim 9, wherein the bearing end plate serving as a preloading element features an outer ring, an inner ring and a plurality of bars connecting the outer ring with the inner ring.

13. An electrical machine in accordance with claim 12, wherein the bars run in a radial direction.

14. An electrical machine in accordance with claim 12, wherein the bars are embodied bent and do not run in a radial direction.

* * * * *